United States Patent [19]
Ortiz, Jr.

[11] Patent Number: 4,984,885
[45] Date of Patent: Jan. 15, 1991

[54] METHOD AND APPARATUS FOR HIGH POWER OPTICAL FIBER INJECTION AND ALIGNMENT

[75] Inventor: Angel L. Ortiz, Jr., Scotia, N.Y.

[73] Assignee: General Electric Company, Schenectady, N.Y.

[21] Appl. No.: 451,061

[22] Filed: Dec. 15, 1989

[51] Int. Cl.$^5$ .......................... G01B 11/27; G01J 1/20
[52] U.S. Cl. ................................. 356/153; 250/201.4; 350/96.2; 356/400
[58] Field of Search ...................... 356/73.1, 153, 400; 250/330, 338.1, 201.1, 201.4; 350/96.2

[56] References Cited

U.S. PATENT DOCUMENTS

| | | | |
|---|---|---|---|
| 4,542,956 | 9/1985 | McCrickerd | 356/153 |
| 4,564,736 | 1/1986 | Jones et al. | 219/121 |
| 4,676,586 | 6/1987 | Jones et al. | 350/96.20 |
| 4,679,908 | 7/1987 | Goodwin | 350/96.2 |
| 4,681,396 | 7/1987 | Jones | 350/96.18 |
| 4,722,587 | 2/1988 | Thorsten | 356/153 |
| 4,764,655 | 8/1988 | Ortiz, Jr. et al. | 219/121.83 |
| 4,840,450 | 6/1989 | Jones et al. | 350/96.20 |
| 4,884,015 | 11/1989 | Sugimoto et al. | 350/96.2 |

OTHER PUBLICATIONS

"Automated Single-Mode Fiber Alignment System" is a sales brochure of Newport Corporation.

Primary Examiner—F. L. Evans
Attorney, Agent, or Firm—John S. Beulick; James C. Davis, Jr.; Paul R. Webb, II

[57] ABSTRACT

A method and apparatus for controlling injection of a high power beam into an optical fiber including generating a signal representative of a focus spot on an injection end of the optical fiber and adjusting the optical fiber injection end location dependent upon the representative focus spot signal. In one embodiment, the present system includes a vision system for generating the representative focus spot signal and a high speed vision processor coupled to the vision system. An x-y-z stage controller is coupled to the vision processor and receives image signals from the vision system. The controller is coupled to a fiber holder, and the controller generates control signals which control operation of the fiber holder. The fiber holder includes x-y-z axis stages and means for engaging the optical fiber.

19 Claims, 5 Drawing Sheets

METHOD AND APPARATUS FOR HIGH POWER OPTICAL FIBER INJECTION AND ALIGNMENT

The present invention is directed in general to optic systems in which a laser beam is injected into an injection end of an optical fiber and, more specifically, to laser materials processing systems in which a high power laser beam is injected into the injection end of an optical fiber for transmission to a remote end of the fiber where materials processing is performed with an emitted beam.

BACKGROUND OF THE INVENTION

Laser materials processing as known in the art and used herein refers to performance of materials processes, such as cutting, welding, drilling and soldering, using a continuous wave or pulsed laser beam. The average power of such a laser beam may range from as little as approximately one watt to 100's of watts, the specific power being selected on the basis of the particular processing being performed. It is also known in the art to transmit the laser beam from the laser source to the vicinity of the workpiece by means of an optical fiber. Apparatus and method for injecting a power laser beam into an optical fiber for transmission therethrough are disclosed in commonly assigned U.S. Pat. Nos. 4,564,736; 4,676,586; and 4,681,396 respectively entitled "Industrial Hand Held Laser Tool and Laser System", "Apparatus and Method for Performing Laser Material Processing Through a Fiber Optic", and "High Power Laser Energy Delivery System", the specifications of those patents being incorporated in their entirety herein by reference.

As disclosed in the above incorporated patents, injection of the laser beam into a fiber injection end is accomplished by focusing the beam, by means of one or more lenses, onto the prepared input end of the fiber. Specific requirements for the size of the focused beam cone, the beam spot size as focused on the fiber end, and the fiber end preparation are described in the above-identified patents. Compliance with these requirements is necessary in order to successfully inject the laser beam into the optical fiber for transmission therethrough. Implicit in these requirements is the need to properly align the focused laser beam with the fiber end. Misalignment of the beam and fiber end will result in either inefficient or no beam transmission through the fiber. Further, where the laser beam has sufficient power, misalignment will result in damage to the fiber end thereby requiring replacement of the fiber or repair of the fiber end.

Various techniques are known in the art for aligning optical components, such as the alignment of a single core optical fiber with a focused laser beam. Such optical alignment techniques include the use of cameras, microscopes, low power aligning lasers, infrared viewing of a power laser operated at low, non-damaging power levels or some combination of these techniques. A common characteristic of these optical alignment techniques is that they are time consuming, require performance by a skilled optics technician and are based on a subjective assessment made by that technician. That is, the optics technician uses his/her skill to subjectively judge, based on observation using one of the listed alignment techniques, when the components are aligned. The time consuming aspect of such optical alignment techniques and the need for their practice by a skilled optics technician present a problem in a manufacturing environment where laser materials processing is practiced. While it is acknowledged that the known optical techniques provide accurate alignment, it would be desirable to provide an automated technique analogous to such optical techniques that enables positioning of a fiber.

Further, during a processing operation and in order to increase the transmission efficiency of the optical fiber, the beam alignment with the optical fiber injection end may require adjustment. No known system, however, provides automated, real-time optical fiber injection end beam alignment during an entire materials processing operating cycle. With known systems, optical sensors are disposed adjacent the fiber output end where a beam is emitted. If a decrease in the output beam intensity occurs, the beam alignment at the injection end is checked. This monitoring usually is performed by a skilled optics technician.

If the technician does not respond in a timely manner, the optical fiber may be damaged, thereby requiring a time-consuming and costly repair and/or replacement of the optical fiber. Even if the technician responds in time to prevent damage requiring a shut down, during the time required to realign the beam and optical fiber injection end, the system will be operating at less than optimum efficiency.

It is therefore a principal object of the present invention to provide apparatus and method for automated positioning of an optical fiber for laser beam injection which is not subject to the aforementioned problems and disadvantages.

SUMMARY OF THE INVENTION

In accordance with the present invention, there is provided an apparatus and a method for positioning an input, i.e. injection, end of an optical fiber at an optimized location for injection with a laser beam. The fiber is mounted in a fiber holder means for adjustably moving the fiber end in x, y and z mutually orthogonal coordinate directions to achieve the automated positioning. With the fiber so mounted, the laser beam axis and a longitudinal axis of a fiber end portion adjoining the fiber end are parallel to the z-direction.

The present invention further includes an infrared viewer axially aligned with the optical fiber end, and the viewer is coupled to a camera such as a charged coupled device (CCD) camera. Output from the camera is coupled to a high speed vision processor which is coupled to a monitor and an x-y-z stage controller. The x-y-z stage controller is coupled to the fiber holder means including an x-y-z stage.

In operation, the present invention provides that an optimized focused spot size is maintained and that the focused spot is centered on the optical fiber end. Specifically, an optimum spot size and location are stored in the system memory and an initial beam alignment is determined. During a materials processing operation, the x-y-z stage controller receives input from the high speed vision monitor regarding the current focused spot size and focus spot location. The current spot size and location are compared with the predetermined, optimum spot size and location. If any deviations occur, the controller generates control signals which are transmitted to the x-y-z stage. The control signals provide that the x-y-z stage will realign the injection end of the optical fiber with the high power beam to achieve optimum injection.

During the materials processing operations, the present system operates in substantially real-time and maintains the optical fiber end at an optimum location. This automated alignment facilitates preventing damage to the optical fiber injection end and increasing the transmission efficiency of the optical fiber. Further, the present system does not require continuous monitoring by a skilled optics technician, and also provides that any necessary realignment will be performed in a timely, and relatively fast, manner.

BRIEF DESCRIPTION OF THE DRAWINGS

These and other objects of the present invention, together with further features and advantages thereof, will be apparent from the following detailed specification when read together with the accompanying drawing, in which.

DETAILED DESCRIPTION OF THE INVENTION

The present invention is directed to an apparatus and method for automated positioning of an optical fiber injection end for injection with a laser beam including high power laser beams, so that the fiber end is maintained at an optimal location. Portions of the present invention, as described herein, may be embodied in a computer implemented process. It should be recognized that the computer implemented process is utilized to interpret data and control various physical elements of the apparatus. Further, the present method utilizes certain scientific equations to determine optimum and current operating parameters. The method, when considered as a whole, is directed to controlling physical elements of a high power optical fiber injection and alignment system.

Figure 1:
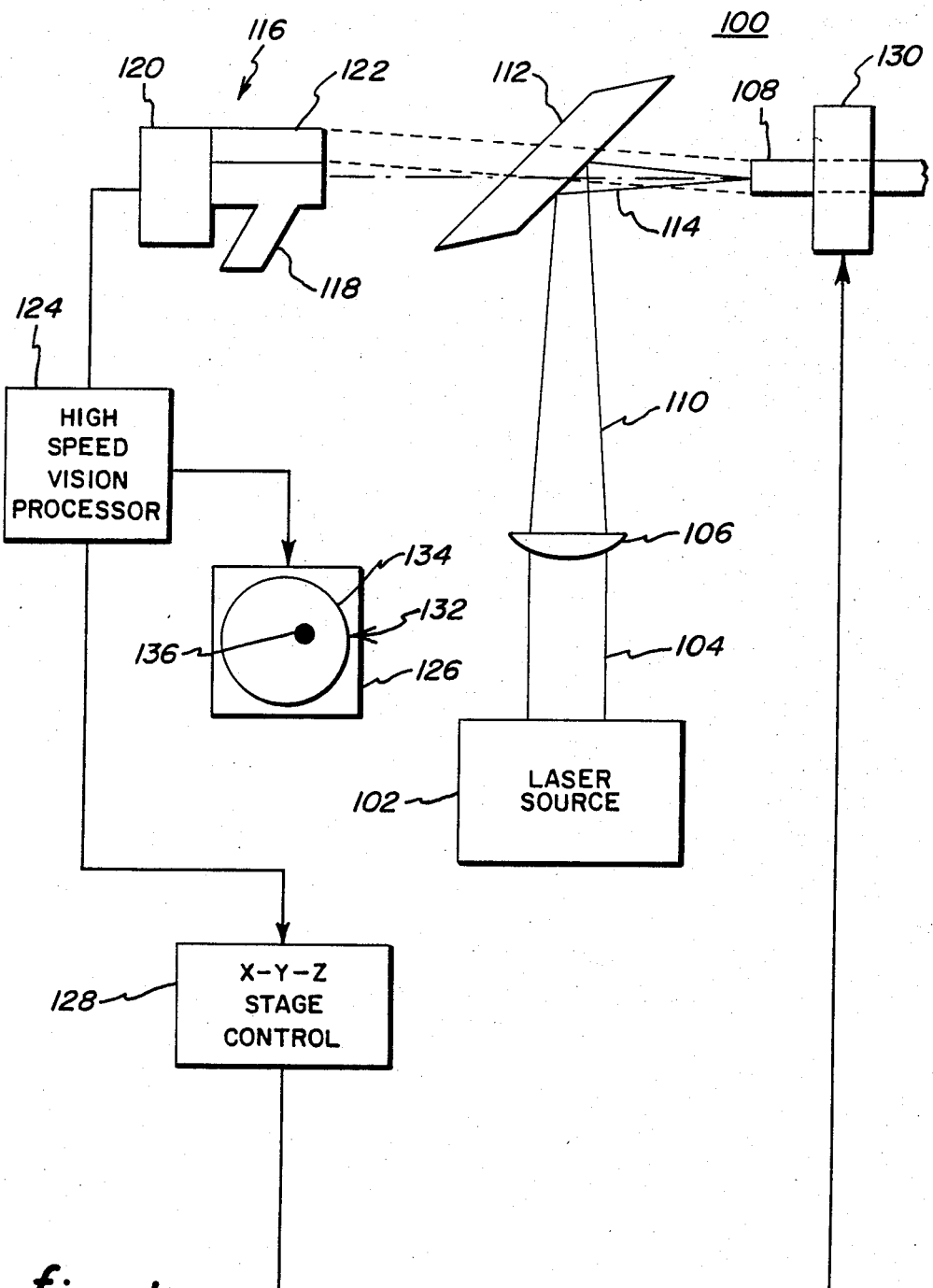
FIG. 1 illustrates an apparatus for automated high power fiber injection and alignment in accordance with the present invention.

Referring now to FIG. 1, an apparatus 100 in accordance with the present invention is illustrated. The apparatus includes a laser source 102 for generating and emitting a collimated laser beam 104. Laser source 102 may be a solid state neodymiumyttrium aluminum garnet (YAG) laser source, or any laser source which operates in a pulse mode or continuous wave mode and emits a beam having a wavelength in the near infrared or visible spectrum. Other suitable solid state laser sources include, for example: ND:glass; ND:GGG (Gadolinium Gallium Garnet); ND:GSGG (Gadolinium Scandium Gallium Garnet); a ruby laser; and an alexandrite laser. The ND:YAG and ND:glass lasers have a wavelength of 1.06 micrometers in the near infrared and the ruby laser has a wavelength of 680 nanometers, in the visible spectrum. The present invention is not limited to practice with any one particular laser source.

Collimated beam 104 is intercepted by a focusing lens 106. Focusing lens 106 is represented as a single planoconvex lens for focusing a laser beam for injection into an optical fiber 108. Importantly, any lens apparatus for focusing a laser beam for injection into optical fiber 108 could be utilized for performing the focusing function.

A beam 110 emitted from focusing lens 106 is intercepted by a mirror 112. Mirror 112 preferably is a mirror having characteristics which provide maximum reflection when disposed at an angle of 45° relative to the axis of a beam impinging thereon, the beam having a wavelength of 1.06 micrometers. Mirror 112, as well known in the art, may be coated with a dielectric material. The reflectivity of the dielectric coating decreases as an incident beam angle deviates from the prescribed angle. Mirror 112, and specifically the back surface of the mirror, may be coated with an antireflection coating selected according to the laser beam wavelength to reduce reflection of a portion of the beam transmitted by the front surface of the mirror. It is further noted that the present invention is not limited to the use of a coating which provides a maximum reflectivity at a prescribed angle of 45°. The prescribed angle is provided from the preferred mounting of the mirror in the embodiment illustrated in FIG. 1.

Beam 114 reflected from mirror 112 impinges upon optical fiber 108. As is well known in the art, optical fiber 108 includes a quartz core. The quartz core is clad with silicone or glass, and has a nylon shielding or jacket for mechanical protection. Beam 114 is focused to a small spot whose diameter is less than the diameter of the quartz core of the optical fiber. The spot size(ss) of the focused spot is defined as:

$$ss = BQ[f/D], \quad (1)$$

where BQ equals the high power laser source beam quality, f equals the focal length of lens 106, and D equals the diameter of collimated beam 104 on focusing lens 106.

As also known in the art, the beam quality of a laser beam is the product of the beam diameter and beam divergence, typically expressed in mm-mrad. The beam quality remains constant through any beam expansion process. Thus, expanding a beam serves to reduce the beam divergence and also serves to reduce the focused spot size. Further, as the focal length of the focusing lens is increased, the spot size increases. Since there is both a theoretical and practical limit on the minimal value of beam divergence for a given fiber core diameter, there is a maximum lens focal length that cannot be exceeded without violating the above described spot size criterion. While there is such a limitation on increasing the lens focal length, there is a conflicting desire to increase the focal length in order to minimize the beam entry cone angle.

As is apparent from equation (1), the size of a spot that can be focused onto the optical fiber core is dependent on the beam quality of the beam being focused. The focused spot size depends directly on the beam quality. Further, as spot size decreases, the achievable focused spot power density increases. An increase in power power is desirable because it provides that materials processing operations can be performed more quickly and possibly even more accurately. Therefore, the object is to minimize the focused spot diameter and thereby maximize focused spot power density.

As further shown in FIG. 1, the present invention includes a fiber end vision system 116. System 116 comprises an infrared viewer 118 which, for example, may be an infrared viewer commercially available from FJW Industries, Model 8449. The infrared viewer is coupled to a camera 120. Camera 120 may, for example, be a charge coupled device (CCD) or charge injected device (CID). A camera such as a commercially available camera from General Electric Company, GE 2509, or Model JE3262M minicolor camera manufactured by Javelin Electronics of Torrance, Calif. may also be utilized. The Javeline Electronics camera has enough wavelength sensitivity that it may replace the FJW and GE infrared viewer-camera combination. The Javeline Electronics mini camera may be preferable in some applications because it provides color information e.g., He-Ne laser would be seen as red, ND:YAG would be seen as green. Also, with the Javeline Electronics camera, several wavelength lasers simultaneously impinging on a fiber face could be easily distinguished. A diode laser 122 is mounted directly above the infrared viewer. Diode 122 may, for example, be a He-Ne laser diode or any other diode suitable for flooding, i.e. illuminating, the fiber injection end.

A high speed vision processor 124 is coupled to vision system 116. The high speed vision processor may be a processor such as commercially available Model #DT2255 by Data Translation of Marlboro, Mass. The Data Translation vision processor provides real-time data acquisition information.

One output of the vision processor is coupled to a monitor 126. Another output from the vision processor is coupled to an x-y-z stage controller 128. The monitor may be a commercially available monitor such as Sony Model PVM2030 color monitor. The x-y-z stage controller may, for example, be a microprocessor-based system such as an Apple Macintosh IICX. The output from the x-y-z stage controller is coupled to a miniature x-y-z stage 130, which comprises part of an optical fiber holder. The optical fiber holder, including the miniature, motorized x-y-z stage may be one such as the holder described in commonly assigned U.S. Pat. No. 4,840,450, entitled "Apparatus and Method for Optical Fiber End Positioning for Laser Injection", which is incorporated herein, in its entirety, be reference.

Briefly, during a materials processing operation, beam 104 is emitted from source 102 and intercepted by focusing lens 106. The focused beam, after reflection by mirror 112, is injected into the injection end of optical fiber 108. Diode 122 illuminates the injection end of the optical fiber and infrared viewer 118 views the focused spot and the optical fiber injection end. The signals generated by the vision system 116 are processed by high speed vision processor 124. As illustrated in FIG. 1, monitor 126 generates an image 132 from the processed signals. The image, as shown in FIG. 1, identifies a perimeter 134 of the optical fiber and also an image 136 of the focused spot. Focused spot 136 is shown as being off-center for illustrative purposes only. Preferably, focused spot 136 is maintained in the center of optical fiber 108. The x-y-z stage controller also receives signals generated by the high speed vision processor. Controller 128 generates control signals transmitted to x-y-z stage 130 which operates to position the optical fiber injection end so that the focused spot is maintained at a central location on optical fiber 108 and so that the spot size at an optimum size.

Figure 2A:
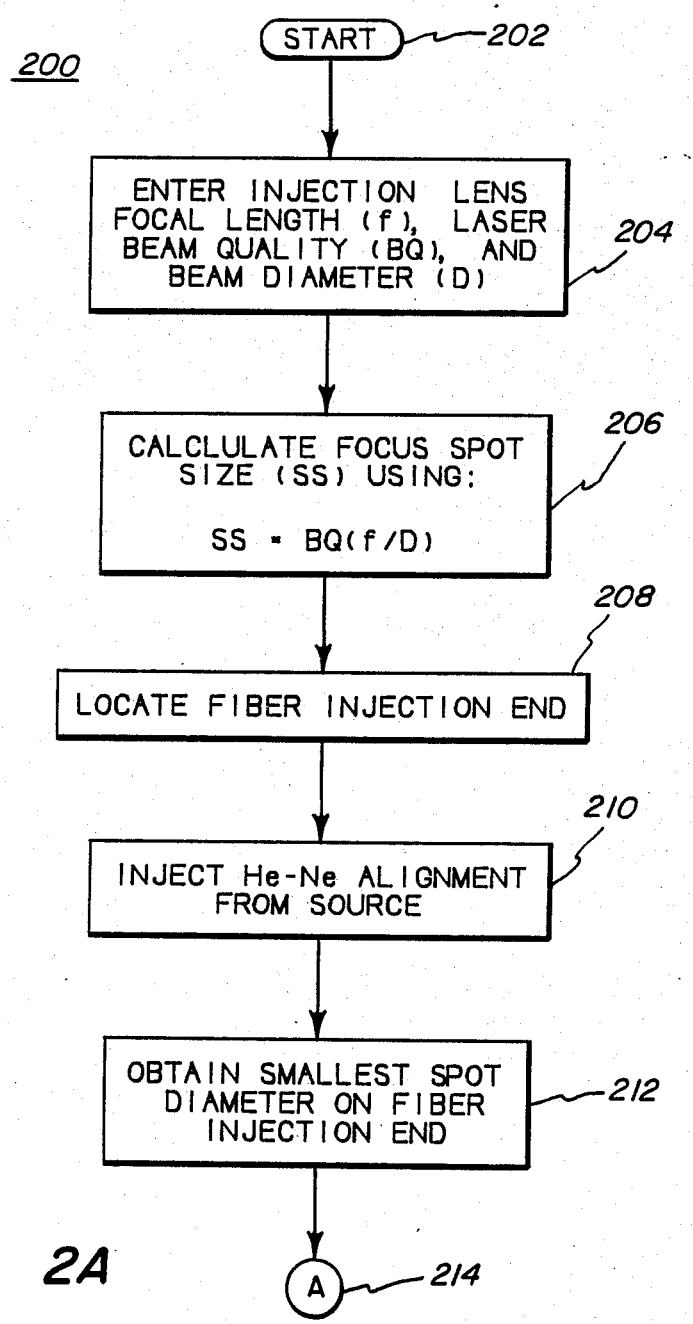
FIGS. 2A-C illustrate a method of operation for the apparatus illustrated in FIG. 1.
Figure 2B:
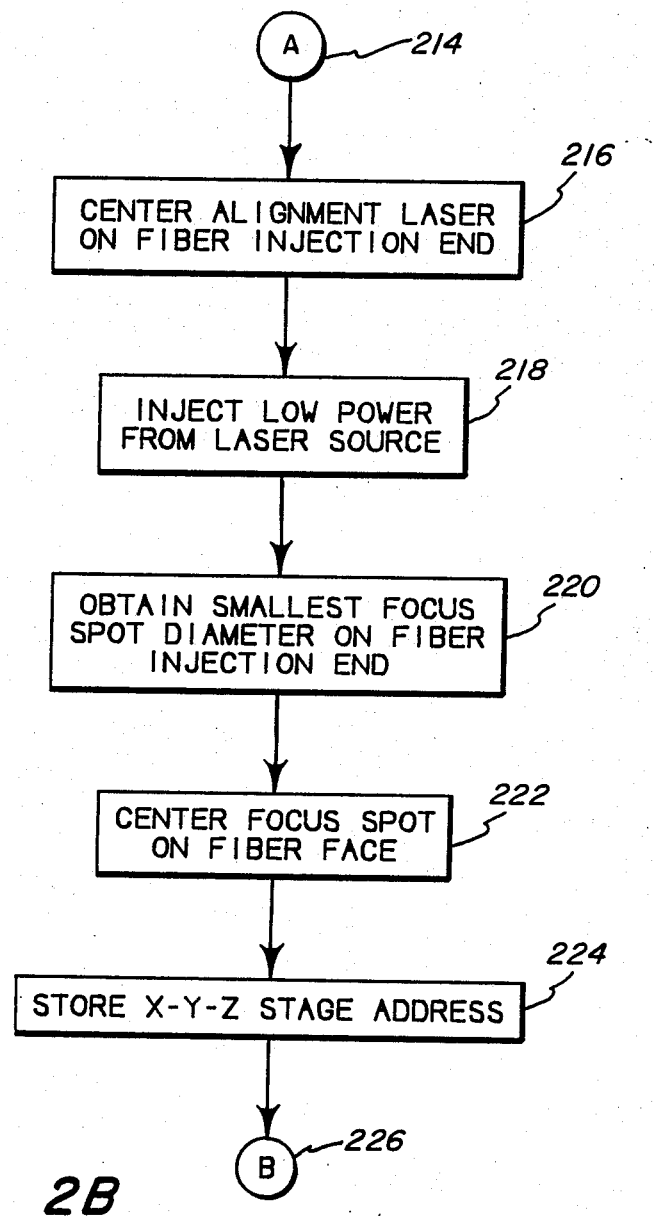
Figure 2C:
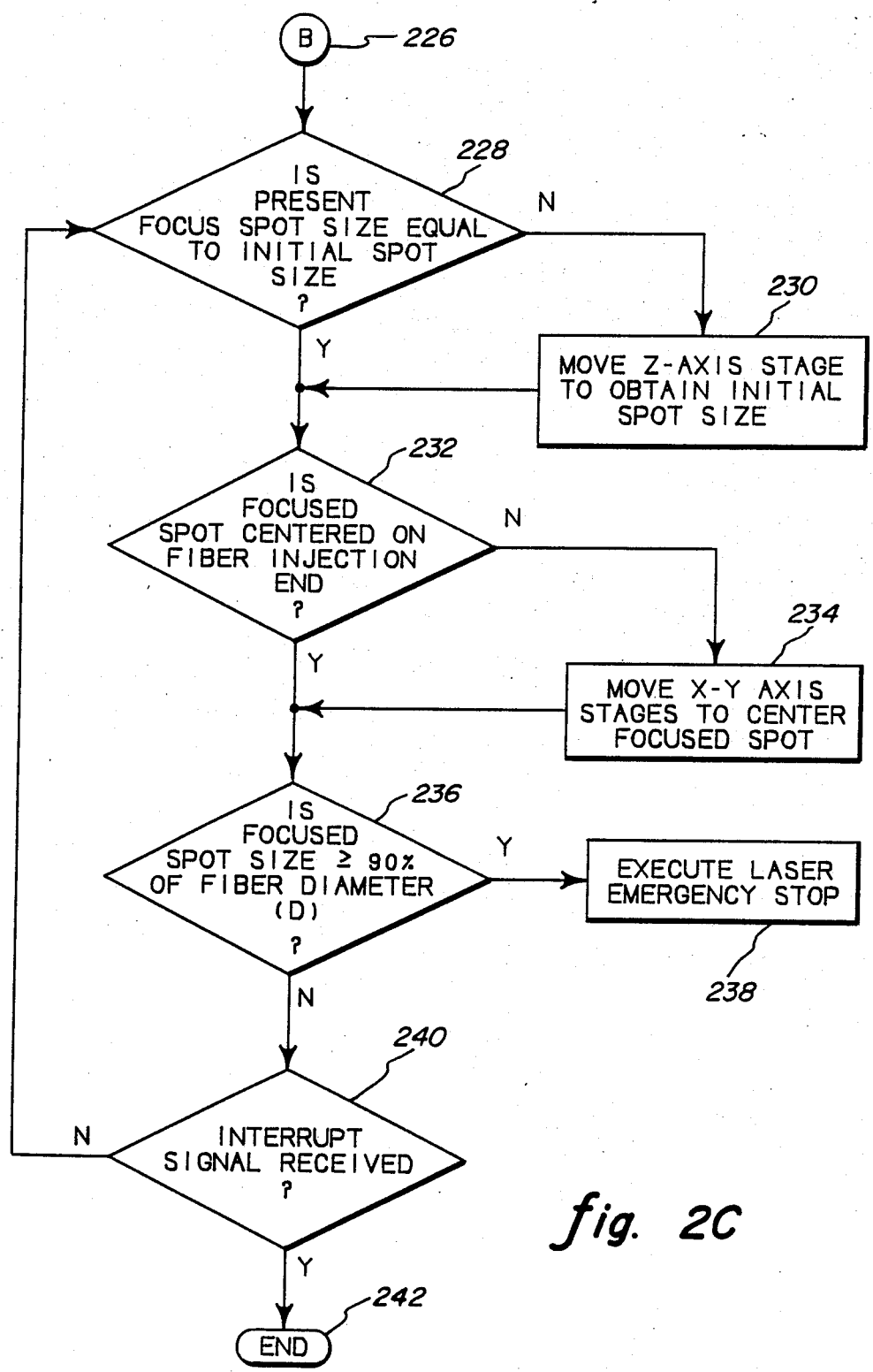

Referring now to FIGS. 2A-C, a method 200 for controlling operation of apparatus 100 is illustrated. It should be recognized that some of the method steps illustrated in FIGS. 2A-C could be performed by human operators and/or computercontrolled mechanisms. Further, the present method is not limited to practice with only the specific components identified herein. Rather, the present method can be utilized to control the apparatus for high power optical fiber injection and alignment described herein and any equivalent apparatus.

As used herein, the term "system user" may refer to, for example, a human operator and/or a computer. To facilitate full automation, it is contemplated that every step identified in FIGS. 2A-C could be computer implemented.

Referring to FIG. 2A, after starting the operation as indicated at a start block 202, a system user enters injection lens focal length, laser beam quality, and beam diameter as indicated at block 204. The injection lens focal length is available from operating specifications supplied with the focal lens. Laser beam quality would depend upon the particular operation being performed. Beam diameter is available from operating specifications supplied with the laser source.

The present method proceeds by then calculating focused spot size using equation (1) as indicated at block 206. This calculated focus spot size is the optimum spot size and its value is stored in system memory. Then, the system locates, with the infrared viewer, a fiber injection end as indicated at block 208. Locating the fiber injection end is facilitated by illuminating the end of the optical fiber with diode 122. Specifically, diode 122 emits a light beam which, in part, impinges against the injection end of the optical fiber. Diode 122 floods, i.e. illuminates, the injection end of fiber during the entire remaining operation. The infrared viewer will detect the beams reflected from the fiber injection end, and camera 120 will generate image signals representative of the reflected beams. The vision processor interprets the image signals and generates data regarding the position of the optical fiber. This generated position data is transmitted to the x-y-z stage controller. The vision processor also provides data to monitor 126 which produces an image of the fiber end.

It is contemplated that an autofocus and zoom lens could be mounted on the infrared viewer. The autofocus and zoom lens would be computer controlled so that the image of the fiber end on the monitor is as large as possible, with the entire fiber end perimeter still shown on the monitor. Known edge detection systems, such as pixel intensity and/or pixel color systems, could be utilized to facilitate this operation. For example, the system described in Ortiz, Jr. et al., U.S. Pat. No. 4,764,655 entitled "Real-Time Laser Beam Diameter Determination In a Laser-Materials Processing System", which is assigned to the present assignee and incorporated herein, in its entirety, by reference, may be utilized.

As indicated at block 210, the process proceeds by injecting a He-Ne alignment laser from the laser source 102. Then, with the alignment laser being injected into the optical fiber, x-y-z state controller 128 transmits control signals to the x-y-z stage so that the optical fiber is positioned to obtain the smallest focus spot diameter of the alignment beam on the fiber end as indicated at block 212. The process continues, as indicated by continuation block "A" labelled 214, to steps illustrated in FIG. 2B. Specifically, as indicated at block 216, the process continues by centering the alignment laser on the fiber injection end. Obtaining the smallest focus spot and centering the alignment laser are operations which are performed utilizing known imaging techniques. Specifically, the locations at where the beam impinges upon the optical fiber injection end will reflect light of a greater intensity than where only the flood beam impinges upon the optical fiber. By detecting the intensity differences utilizing the infrared viewer and camera, the size and position of the focus spot is determined. Using this information, the x-y-z stage controller can control the position of the optical fiber end to center the focus spot and obtain the smallest possible focus spot diameter.

Once the alignment laser focus spot has been optimized, the laser source is operated to emit a low power beam, and the low power beam is injected into the optical fiber as indicated at block 218. Again, with the low power beam, the controller adjusts the x-y-z stage to obtain a smallest focus spot diameter on fiber injection end as indicated at block 220. The low power beam focused spot is then centered on the fiber end as indicated at block 222. The current address, i.e. position of the x-y-z stage, as indicated at block 224, is then stored in the system memory.

It is contemplated that the initial alignment process may be performed entirely by a computer implemented process. In performing the initial alignment, for example, the minimum spot size would be determined by obtaining a signal representative of focus spot area versus x-y-z stage position. The optimum x-y-z stage position is identified at the minimum spot area value. This signal could be obtained, for example, by varying the location, incrementally, of the x-y-z stage and recording spot size. The center location of focused spot on the optical fiber could likewise be determined by centering and fiber perimeter algorithms such as described in U.S. Pat. No. 4,764,655. If a human operator performs the initial alignment, the image generated by monitor 126 could be utilized by the human user. The human user would control movement of the x-y-z stage to obtain the initial alignment.

The operations illustrated in FIG. 2B continue to the operations illustrated in FIG. 2C as indicated by continue legend "B" 226. The sequence of operations illustrated in FIG. 2C also illustrate operation of x-y-z stage controller 128 during a materials processing operation. Specifically, once the alignment processes are completed for the alignment laser and low power laser, a high power beam from the laser source is injected into the fiber injection end. With the high power beam, the system computer obtains the smallest focus spot and centers the focus spot on the injection end of the optical fiber. From the previous alignment with the alignment laser and low power laser, the focused spot should be centered and the spot size should substantially equal the optimum spot size calculated in step 206.

As indicated at decision block 228, the controller then determines whether the present focused spot size is equal to the optimum spot size. This comparison is performed by determining the present spot size from vision processor signals, and then determining any difference between the stored, optimum spot size signal and the present spot size signal. If there is a difference between these signals, the controller will move the z-axis stage to obtain a spot size equal to the optimum spot size as indicated at block 230. If the present spot size is equal to the optimum spot size, or once the present spot size is equal to the optimum spot size after adjusting the position of the z-axis stage, the system then determines whether the focused spot is centered on the fiber injection end as indicated at block 232. This determination is made from signals output by the vision processor. If the focused spot is not centered, the process continues by the controller transmitting control signals to move the x-y axis stages to center the focused spot as indicated at block 234.

To facilitate maintaining the desired alignment, the computer implemented process incrementally adjusts the position of the x-y-z stage until the optimum operating parameters are achieved. More specifically, if the optimum spot size equals OSS, and if the present spot size is of a value greater than OSS, then the controller causes the z-axis stage to move an incremental distance from the mirror. If, upon making this incremental adjustment, the present spot size further increases, then the controller causes the z-axis stage to move an incremental distance towards the mirror. The z-axis stage is incrementally adjusted until the present spot size is substantially equal to the optimum spot size.

If the focused spot is off-center, then the controller causes the x-axis stage and/or y-axis stage to incrementally adjust the location of the injection end relative to the beam. The adjustment continues until the focused spot is centered. Many methods may be utilized to determine which axis stage to adjust, such as by defining quadrants. If the present focus spot location is off-center, predetermined control signals, determined according to the quadrant in which the focus spot is located, are transmitted to the x-y axis stages. The process is repeated until the focused spot is centered. Many other methods are contemplated and may be utilized.

Once the focused spot is centered, or if the focused spot was centered, the controller then determines whether the focused spot size is greater than or equal to 90% of the optical fiber diameter as indicated at block 236. If the focused spot size is equal to or greater than 90% of the fiber diameter, and as indicated at block 238, the controller executes a laser emergency stop and discontinues operation. This condition indicates the laser beam quality is degrading and operation must be terminated to prevent damage. If, on the other hand, the focused spot size is less than 90% of the focused diameter, the system then checks to determine whether an interrupt signal has been received as indicated at block 240. An interrupt signal generally would be one provided by a system user once operations are completed. If no interrupt signal is received, the process continues by returning to the operations illustrated above and specifically beginning at block 228. If an interrupt signal is received, the operation is stopped as indicated by end legend 242.

The present method and apparatus provide many advantages, including that an optimized focused spot is maintained and centered on the optical fiber end. Further, the present system facilitates preventing damage to the optical fiber injection end and increasing the transmission efficiency of the optical fiber. The present invention also compensates for laser pointing instability by maintaining fiber injection alignment throughout the entire laser operation parameter range. The present system also does not require continuous monitoring by a skilled optics technician, provides that any necessary realignment will be performed in a timely, and relatively fast, manner, and can also be used to alert an operator that flashlamps in the laser source require changing because of laser beam quality degradation.

Figure 3:
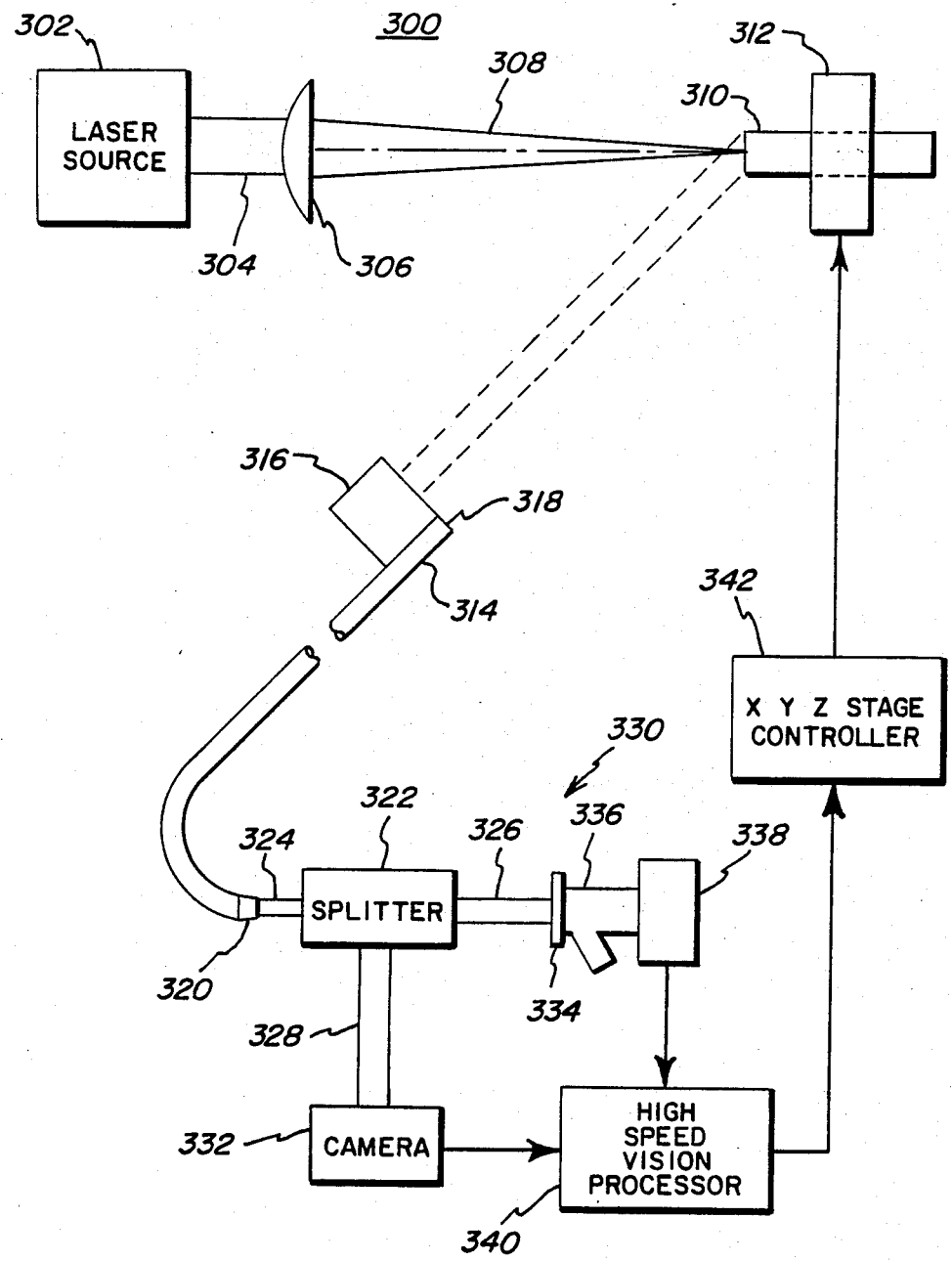
FIG. 3 illustrates an alternative embodiment of an automated optical fiber injection and alignment system in accordance with the present invention.

An alternative embodiment of an apparatus in accordance with the present invention is illustrated in FIG. 3. Specifically, apparatus 300 includes a laser source 302 which emits a collimated beam 304. A focus lens 306 intercepts the collimated beam and focuses a beam 308 on an injection end of an optical fiber 310. Optical fiber 310 is maintained in engagement with an x-y-z stage 312, which comprises part of the optical fiber holder. A coherent vision bundle 314 which comprises a bundle of optical fibers is disposed so as to be able to view the focused spot on the injection end of optical fiber 310. A laser diode 316 is mounted on the vision bundle. Vision bundle 314 has an input end 318 and an output end 320. At input end 318, the optical fiber receives optical signals representative of the focused spot on optical fiber 310. At output end 320, the vision bundle 314 emits an optical signal 324 to a beam splitter 322. Beam splitter 322 splits beam 324, a first split beam 326 and a second split beam 328 being transmitted to a vision system 330 and a camera 332, respectively. Vision system 330 comprises a filter 334, an infrared viewer 336 and a CCD camera 338. Filter 334 is a 1.06 micrometer spike filter which serves to minimize noise from the optical signal of the optical vision bundle. CCD cameras 332 and 338 are coupled to a high speed vision processor 340. The vision processor is coupled to an x-y-z stage controller 342 which is coupled to x-y-z stage 312.

Some specific components illustrated in FIG. 3 correspond to components illustrated in FIG. 1, including the CCD camera, high speed vision processor, x-y-z stage controller, laser source, optical fiber holder including x-y-z stage, and laser diode. The commercial components identified with reference to FIG. 1 therefore also could be utilized in the apparatus illustrated in FIG. 3.

While the present invention has been described with respect to specific embodiments, many modifications, variations, substitutions, and equivalents will be apparent to those skilled in the art. Accordingly, the invention is to be considered as limited only by the spirit and scope of the appended claims.

What is claimed is:

1. An apparatus for controlling injection of a high power beam into an optical fiber, said apparatus comprising:
   means for generating, during a materials processing operation, a signal representative of a focus spot on an injection end of the optical fiber; and
   means for adjusting the optical fiber injection end location dependent upon the representative focus spot signal, said adjusting means providing automated adjustment of the optical fiber injection end during the materials processing operation.

2. An apparatus in accordance with claim 1 wherein said signal generating means comprises an infrared viewer coupled to a charge coupled camera.

3. An apparatus in accordance with claim 2 wherein said charge coupled camera is coupled to a high speed vision processor, said vision processor generating first image signals to display the optical fiber injection end and focus spot on a display monitor and generating a second image signal utilized by said adjusting means.

4. An apparatus in accordance with claim 3 wherein said adjusting means comprises a controller coupled to said high speed vision processor and an optical fiber holder coupled to said controller, said holder comprising means for engaging the optical fiber and x-y-z axis stages, control signals emitted from said controller being utilized to control positioning of said x-y-z axis stages.

5. An apparatus in accordance with claim 1 wherein said signal generating means comprises a coherent optical fiber bundle having an input end and an output end, a beam splitter, said optical fiber bundle input end positioned to view the injection end of the optical fiber, the output end of said optical fiber bundle aligned with said beam splitter, a first output of said beam splitter aligned with a vision system and a second output of said beam splitter aligned with a camera, said vision system and camera being coupled to a high speed vision processor.

6. An apparatus in accordance with claim 5 wherein said vision system comprises a 1.06 micron filter coupled to a charge coupled color mini camera.

7. An apparatus in accordance with claim 5 wherein said vision system comprises a 1.06 micrometer filter coupled to an infrared viewer, and a charge coupled camera coupled to said infrared viewer.

8. An apparatus in accordance with claim 7 wherein said adjusting means comprises a controller coupled to said high speed vision processor and an optical fiber holder coupled to said controller, said holder comprising means for engaging the optical fiber and x-y-z axis stages, whereby signals from said controller control positioning of said x-y-z axis stages.

9. An apparatus for controlling injection of a high power beam into an optical fiber, said apparatus comprising:
   a vision system for generating a signal representative of a focus spot on an optical fiber injection end, said vision system including an infrared viewer axially aligned with an injection end of the optical fiber, and a charge coupled camera coupled to said infrared viewer;
   a high speed vision processor coupled to said vision system;
   an x-y-z stage controller coupled to said high speed vision processor; and
   an optical fiber holder coupled to said x-y-z stage controller, said holder including means for engaging the optical fiber and x-y-z axis stages.

10. An apparatus in accordance with claim 9 wherein said vision system further comprises a laser diode.

11. An apparatus in accordance with claim 10 wherein said laser diode is a He-Ne laser diode.

12. An apparatus in accordance with claim 9 wherein said infrared viewer includes means for generating a flood beam for illuminating the optical fiber injection end.

13. An apparatus in accordance with claim 9 wherein said x-y-z stage controller is a micro-processor based system.

14. A method for controlling injection of a high power beam into an injection end of an optical fiber, the beam forming a focus spot on the optical fiber injection end, the fiber and beam being axially aligned along a z-axis, said method comprising the steps of:
   determining a focal length (f) of a focus lens being used to focus the beam on the fiber end, a laser beam quality (BQ), and a beam diameter (D);
   calculating an optimum spot size (ss);
   comparing a present focus spot size with the optimum spot size; and
   adjusting the position of the optical fiber injection end along the z-axis when a difference exists between the present focus spot size and the optimum focus spot size and until the present and optimum focus spot sizes are substantially equal.

15. A method in accordance with claim 14 wherein calculating the optimum spot size comprises the step of: utilizing an equation $$ss = BQ(f/D)$$

to determine the optimum spot size.

16. A method in accordance with claim 14 wherein said method further comprises the steps of:
   determining whether the present focus spot is centered on the fiber injection end, if the present focus spot is not centered then adjusting the position of the optical fiber injection end along the x-y axis.

17. A method in accordance with claim 14 wherein said method further comprises the steps of:
   comparing the focus spot size with the fiber diameter; and
   stopping beam injection if the focus spot size becomes greater than or equal to 90% of the fiber diameter.

18. A method in accordance with claim 14 wherein adjusting the position of the optical fiber is performed in real time.

19. A method in accordance with claim 14 wherein a user alert signal is generated when laser beam quality degrades.

* * * * *